July 7, 1964 H. EBEL 3,140,356

COMMUNICATION SYSTEM EMPLOYING FREQUENCY SELECTION OPERATIONS

Filed June 22, 1960 2 Sheets-Sheet 1

July 7, 1964 H. EBEL 3,140,356

COMMUNICATION SYSTEM EMPLOYING FREQUENCY SELECTION OPERATIONS

Filed June 22, 1960 2 Sheets-Sheet 2

United States Patent Office 3,140,356

Patented July 7, 1964

3,140,356

COMMUNICATION SYSTEM EMPLOYING FREQUENCY SELECTION OPERATIONS

Herbert Ebel, Munich, Germany, assignor to Siemens & Halske Aktiengesellschaft, Berlin and Munich, a corporation of Germany Filed June 22, 1960, Ser. No. 37,869
Claims priority, application Germany June 23, 1959
6 Claims. (Cl. 179—84)

Figure 1:
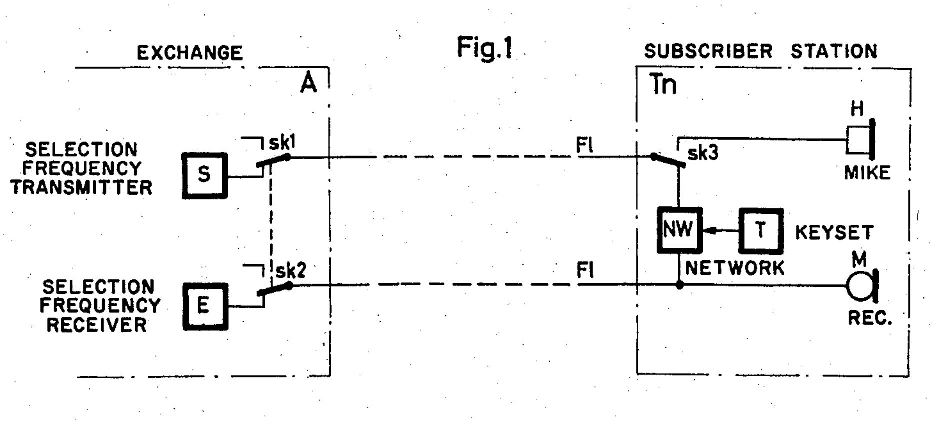

The invention disclosed herein is concerned with a circuit arrangement for a communication system, especially a telephone system, operating with frequency selection, wherein at least one frequency (or respectively a frequency gap in a given frequency series), serves for the marking of a selection information, and comprising, arranged in the exchange, transmitting and receiving devices for the selection frequencies and also part of a bridge circuit.

Faulty selection operations may be produced in a telephone system operating with frequency selection, owing to frequencies or frequency combinations contained in voice currents originating at a microphone which is operatively connected to a telephone line. In order to avoid faulty selection operations due to this cause, known systems employ special measures to guard against the effects of voice or speech currents.

In a known system, described in the British Patent No. 646,288, the problem of guarding against the effects of voice or speech currents, in the selection operations, is solved by special measures involving the disconnection of the microphone of a subscriber station, during the selection operations, so that voice frequencies cannot cause a wrong selection.

Another aspect to be considered in connection with frequency selection resides in the desirability to carry out such selection over relatively long telephone lines. This is not possible in the case of the known arrangement because the transmission path extends from the selection frequency transmitter to the selection frequency receiver, over oscillation circuits disposed at the subscriber station involved in a call, resulting, in the case of relatively long telephone lines, due to the line resistance, necessarily in a strong reduction of selectivity of the oscillation circuits. Accordingly, arrangements of this kind provide in addition to the frequency selection, selection operations governed by impulses.

The object of the present invention resides in improving the known circuit arrangement by the provision, in the exchange, in addition to the transmitting and receiving devices for the selection frequencies, of part of a bridge circuit, in which the telephone lines form a bridge arm and a line substitution or balance circuit forms a corresponding bridge arm, and in which the selection frequency transmitter is connected in one bridge diagonal and the selection frequency receiver in the other bridge diagonal, and comprising, disposed at the subscriber stations, oscillation circuits which are connectible to the respective telephone line by means of selection keys, whereby the bridge circuit may be selectively balanced.

In this arrangement, the selection frequency transmitter offers a series of given individual frequencies and the path to the selection frequency transmitter is for individual frequencies blocked by filter means disposed at a subscriber station involved in the call. This is effected by tuning or balancing, for the individual frequencies, the bridge circuit which is in part disposed in the exchange. Let us assume that the frequency selection transmitter transmits ten individual frequencies and that the path to the receiver is, for the marking of ten digits, always blocked for one of these ten frequencies. It is then merely necessary to connect at the subscriber station only one oscillation circuit, the selection frequency receiver receiving, however, nine frequencies simultaneously. Accordingly, as compared with the known arrangement, in which only the one respective individual frequency is in an analogous case passed to the frequency receiver, there are passed to the receiver, with each selection signal, nine frequencies instead of only one frequency. An erroneous selection could be effected by a microphone, connected during the selection, only if the respective nine frequencies would effect the microphone simultaneously and with suitable magnitude. This is practically never the case. The arrangement according to the invention therefore does not require any particular measures for guarding against voice currents.

Similar conditions also prevail in the case of a combination selection, for example, in a case in which two of five frequencies are to be suppressed.

The arrangement according to the invention enables carrying out frequency selection even in the case of long telephone lines, since the frequency-determining oscillation circuits are disposed in a bridge arm, thereby directly affecting the bridge equilibrium.

The various objects and features of the invention will appear from the description of embodiments which is rendered below with reference to the accompanying drawings.

Figure 2:
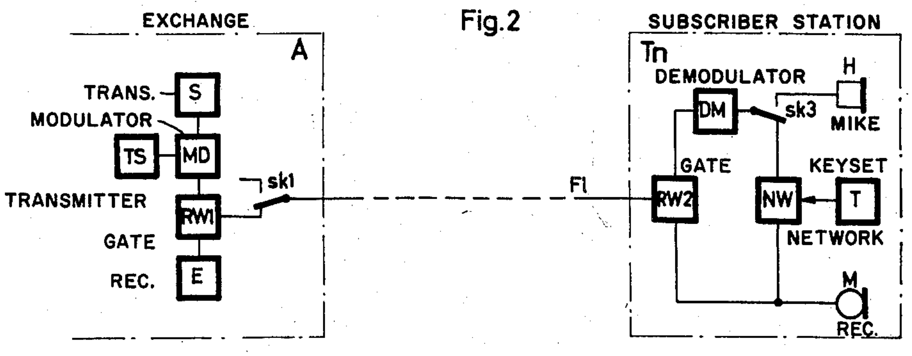
Figure 3:
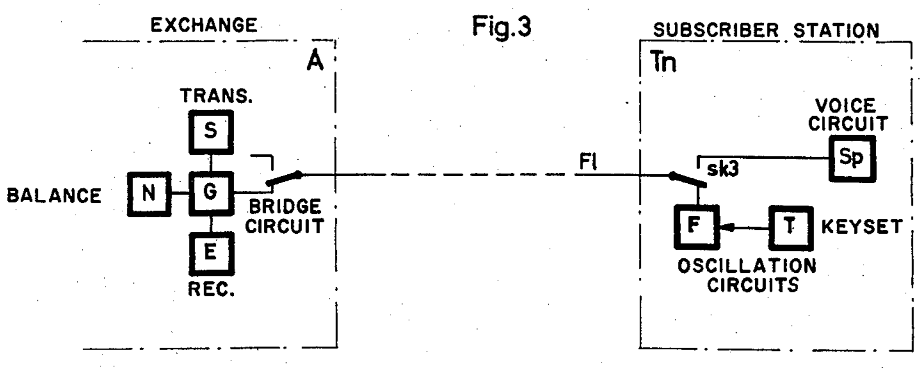
Figure 4:
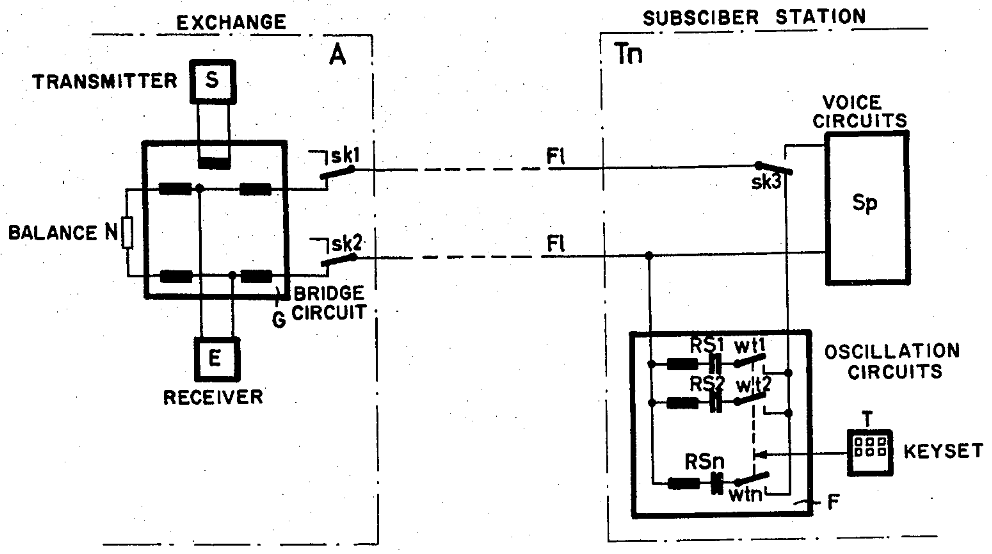

FIGS. 1 to 3 show in schematic manner examples of the transmission path extending between the transmission and receiver devices for the selection frequency; and FIG. 4 represents the example of FIG. 3 in greater detail.

FIG. 1 illustrates an example for a telephone system employing a four-wire connection, in which the transmission path from the selection frequency transmitter to the selection frequency receiver extends over the telephone line while the network with band clock characteristic is arranged at the subscriber station. In the exchange A are provided a selection frequency transmitter S and a selection frequency receiver E. These two devices are common to a plurality of subscribers and are as required connected to the telephone line F1 by means of switching contacts *sk*1 and *sk*2. References H and M indicate respectively the microphone and the receiver and NW and T respectively a network and a key set at the subscriber station T*n*, the key set T being provided for setting the blocking frequencies of the network NW. There is also provided a switching contact *sk*3 at the subscriber station T*n* which disconnects the receiver H during the selection operation.

Removal of the hand set at the subscriber station T*n* results, in the exchange, for example, due to the criterion provided by the loop current, in the switching-in of the transmitter and receiver devices for the selection frequencies and in the connection thereof to the telephone line F1 over the switching contacts *sk*1 and *sk*2. Contact *sk*3 is now actuated at the subscriber station T*n*. This condition is represented in FIG. 1.

In the case of a two-frequency code of five frequencies, the selection frequency transmitter S will transmit five different frequencies all of which will initially reach the selection frequency receiver E over the network NW. The receipt of all these frequencies in the selection frequency receiver E can be employed as an auxiliary criterion, for example, for the control of the register. The loop criterion may also be substituted thereby, so that the control devices for this criterion can be released immediately upon connection of the transmitter and receiver devices for the selection frequencies and thus made available to other subscribers.

Responsive to depression of a selection key at the keyset T, by the subscriber, the transmission path between the selection frequency transmitter S and selection frequency receiver E will be blocked to two of these five frequencies, by the network NW. The receiver E now receives only three frequencies which contain the selection information, and such information is evaluated by the selection frequency receiver E. Upon conclusion of the selection and switching through of the connection to the called subscriber, a selection termination criterion is from there, and preferably from the final selection stage, transmitted back to the calling subscriber, which can be utilized for disconnecting the transmission and receiver devices for the selection frequencies in the exchange and for operatively connecting the receiver H at the calling station T*n*.

The network NW with band block characteristics can be realized, for example, by serially connected parallel oscillation circuits which are tuned to the respective selection frequencies. In the absence of operative actuation of a selection key, there will be provided in the network NW a short circuit of the line conductors to free the transmission path for all frequencies. Filter arrangements are known from the U.S. Patent 2,364,685 and bridge circuits from U.S. Patent 1,579,283, which however are not being used in the manner according to the invention.

FIG. 2 shows parts of a telephone system operating with two-wire connections between the individual subscribers and utilizing for the two transmisison directions different frequency positions. The transmission path for the selection frequencies between the selection frequency transmitter and selection frequency receiver extends as in FIG. 1 over the telephone line and the subscriber station. This example is intended particularly to call attention to the fact that it is advantageous to connect the network NW, in the case of carrier frequency systems, at a point in the transmission path at which the carrier frequency band is again returned to the audio frequency range.

In FIG. 2, there is utilized the audio frequency position for the talking operation as a transmission direction as seen from the subscriber station T*n* and a carrier frequency position is utilized in receiver direction. The directional gate RW2 separates the two frequency positions at the subscriber station and the demodulator DM places the carrier frequency band in the audio frequency range. In the course of a selection, the same frequency positions are used for the selection frequencies and for the speech frequencies, and the frequencies of the carrier frequency transmitter S are for this purpose transformed, by the modulator MD with the aid of the frequency transmitter TS, into the higher frequency position which is provided for one direction of transmission. The converted selection frequencies reach the telephone line F1 over the directional gate RW1 and the switching contact *sk*1. At the subscriber station, they are thereupon conducted over the directional gate RW2 to the demodulator DM and are after demodulation again available as audio frequencies. The switch contact *sk*3 is during the selection operative to close the transmission path over the network NW, directional gate RW2, telephone line F1 and directional gate RW1 to the selection frequency receiver E in the exchange. The marking and evaluation of a selection information is effected analogous to the manner as described in connection with FIG. 1.

If the network NW would be connected in the transmission path ahead of the demodulator DM, there would be required different filter combinations for the respective subscriber stations with different frequency positions. this is prevented by the above described arrangement of the network.

In FIG. 3, the transmission path extends from the selection frequency transmitter S to the selection frequency receiver E over a bridge circuit G which constitutes in this case the network with band block characteristic. The bridge circuit G is by a balance or line substitution circuit N under consideration of the line damping equalized to the resonance impedance of oscillation circuits which are provided at the subscriber station and designated by F. The telephone line F1 serves as a control line over which the resonance impedance of the switched-in oscillation circuits for the respective resonance frequencies is transmitted to the bridge circuit G. If none of the oscillation circuits is switched-in, the equilibrium of the bridge circuit is disturbed by false termination at the line side and the transmission path from the selection frequency transmitter S to the selection frequency receiver E is thereby freed for all frequencies. In case one or two oscillating circuits, corresponding to the utilized frequency code, are connected to the telephone line by operating keys of the keyset T, the resonance impedance of these oscillation circuits, which is transmitted to the bridge circuit over the telephone line, employed as control line, produces the bridge equilibrium for the frequencies corresponding to the resonance circuits of the oscillating circuits. The transmission path between the selection frequency transmitter and the selection frequency receiver is thereby blocked for these frequencies. Depending upon the type of subscriber circuit, the voice current circuit S*p* or only the receiver will be disconnected during the selection operation. The disconnection of the voice current circuit S*p* is recommended, above all when the relative difference between the resonance impedance of the oscillation circuit and the input impedance of the voice current circuit is not great.

FIG. 4 represents the example of FIG. 3 in greater detail with respect to the switching devices thereof which are of interest.

Referring now to FIG. 4, the selection frequency transmitter S is connected to a symmetrical bridge circuit arrangement G to the other side of which is connected the selection frequency receiver E. The manner in which these two devices are connected corresponds to the manner of connecting a four-wire line to the bridge circuit of a four-wire connection. The switching arrangement indicated at F can be connected to the bridge circuit G over the switching contacts *sk*1 . . . *sk*3, which assume during the selection operation the positions in which they are shown, and over the telephone line F1 which is utilized as a control line. The switching arrangement F contains series oscillation circuits RS1 . . . RS*n* and switching contacts *wt*1 . . . *wtn* which are controlled by selection keys of the keyset T. So long as no selection key is actuated, the line conductors of the telephone line F1 will be open and the bridge is terminated high ohmic on the line side. The transmission path between the selection frequency transmitter S and the selection frequency receiver E is thereby freed for all frequencies since the line substitution circuit or balance N, as already mentioned before in connection with the description of FIG. 3, corresponds under consideration of the line attenuation, to the resonance impedance of the oscillating circuits. In the illustrated embodiment, the line substitution or balance N is of specific character and corresponds approximately to the sum of half of the direct current impedance of the longest admissible line loop and the substiution impedance of the series oscillation circuits.

Actuation of one of the selection keys results in connection, to the telephone line, of one or more oscillation circuits, depending upon the frequency code. The bridge circuit is closed for the resonance frequencies of these oscillation circuits and the transmission path is thus blocked for the corresponding selection frequencies.

Changes may be made within the scope and spirit of the appended claims which define what is believed to be new and desired to have protected by Letters Patent.

I claim:

1. A circuit arrangement for communication systems, especially telephone systems operating with frequency selection, wherein the absence of at least one frequency of a sequence of a plurality of frequencies serves for the marking or characterization of a selection information, comprising a transmitter and a receiver for the selection frequencies, and a part of a bridge circuit provided in the system exchange, said bridge part forming with a telephone line, a bridge circuit, wherein such line, based upon its own capacitance and inductance, respectively, represents a bridge arm, said bridge part having a balance, which corresponds to the equivalent inductance and capacitance of the line, forming a corresponding bridge arm, means connecting the selection frequency transmitter to one bridge diagonal and the selection frequency receiver to the other bridge diagonal, a plurality of oscillation circuits disposed at each subscriber station, and a selection key set at each subscriber station comprising means for connecting respective oscillation circuits with said line for blocking at least one selected frequency to designate a desired selection information.

2. A circuit arrangement according to claim 1, wherein said oscillation circuits are constructed as series oscillation circuits, said circuits being resonant at the individual frequencies of the selection frequency transmitter and being individually or in combination connectible by said keyset to the telephone line, a specific resistance employed as a line balance, the magnitude of said resistance corresponding approximately to the sum of half of the direct current impedance of the longest admissible line loop and the substitution impedance of the series oscillation circuits.

3. A circuit arrangement according to claim 2, comprising a plurality of parallel connected series oscillation circuits.

4. A circuit arrangement according to claim 1, wherein said oscillation circuits are constructed as parallel oscillation circuits, said circuits being resonant at the individual frequencies of the selection frequency transmitter and being, dependent upon the selection information, connectible by said keyset to the telephone line individually or in combination, and a specific impedance employed as a line balance, the magnitude of said impedance corresponding approximately to the sum of half of the direct current impedance of the longest admissible line loop and the substitution impedance of the parallel oscillation circuits to be connected.

5. A circuit arrangement according to claim 4, comprising a plurality of parallel oscillation circuits connected in series relation.

6. A circuit arrangement according to claim 1, wherein said bridge circuit contains a hybrid coil.

References Cited in the file of this patent

UNITED STATES PATENTS

| | | |
|---|---|---|
| 2,332,912 | Hecht et al. | Oct. 26, 1943 |
| 2,364,685 | Baker | Dec. 12, 1944 |
| 2,470,145 | Clos | May 17, 1949 |
| 2,554,201 | Lundkvist | May 22, 1951 |
| 2,909,609 | Svala | Oct. 20, 1959 |
| 2,966,659 | Dahlbom et al. | Dec. 27, 1960 |

FOREIGN PATENTS

| | | |
|---|---|---|
| 646,288 | Great Britain | Nov. 22, 1950 |